(12) United States Patent
MacDonald

(10) Patent No.: US 6,937,210 B1
(45) Date of Patent: Aug. 30, 2005

(54) PROJECTING IMAGES ON A SPHERE

(75) Inventor: Alexander E. MacDonald, Boulder, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 321 days.

(21) Appl. No.: 10/288,436

(22) Filed: Nov. 6, 2002

(51) Int. Cl.$^7$ ................................................ G09G 5/00
(52) U.S. Cl. ...................... 345/1.1; 345/428; 362/285; 359/455
(58) Field of Search ..................... 345/7, 428; 434/131; 353/74; 359/455; 362/285

(56) References Cited

U.S. PATENT DOCUMENTS

| 1,042,455 A | 10/1912 | Manson ....................... 434/131 |
| 1,289,849 A | 12/1918 | Manson ....................... 434/131 |
| 3,586,432 A | 6/1971 | Pentes ........................... 353/74 |
| 3,893,748 A * | 7/1975 | De Palma et al. .......... 359/455 |
| 4,451,874 A * | 5/1984 | Friedman .................... 362/285 |
| 6,100,897 A * | 8/2000 | Mayer et al. ............... 345/428 |
| 6,201,516 B1 | 3/2001 | Tanide et al. .................. 345/7 |

* cited by examiner

*Primary Examiner*—Dennis-Doon Chow
*Assistant Examiner*—Tammy Pham
(74) *Attorney, Agent, or Firm*—Thomas Zack

(57) ABSTRACT

A system for projecting images on an object with a reflective surface. A plurality of image projectors are spaced around the object and synchronized such that each projector projects an individual image whose union on the surface of the object forms a composite image. The composite image displayed totally covers the surface. The object may represent the Earth with the projected images representing topographical features of the Earth. If environmental satellite data, such as data from a Geostationary Orbiting Environmental Satellite System is used, real time weather conditions may be displayed on this Earth representation.

10 Claims, 3 Drawing Sheets

PROJECTING IMAGES ON A SPHERE

BACKGROUND OF THE INVENTION

This invention relates to a system for projecting images on a surface such as a spherical shaped surface.

The projection of images on a surface is well known. In many cases the surface is either flat or with a slight curvature. To provide viewed images that appear more life like, artists have developed the concept of perspective. This concept was received by the public as a step forward as it more closely resembles what is actual being seen in three dimensions. When the object surface on which the image is projected is substantially spherical in shape, the images projected can resemble the natural geography of the Earth and be used as a learning tool. Topography and other aspects of the real world can be viewed with such a system. To make the viewed sphere more Earth like and realistic, rotation can be imparted to the sphere and one or more projectors used to project images on the sphere's surface. By using several projectors spaced around the sphere different images can be projected on different surface areas of the sphere to provide what might be considered a continuous surface image. To view the north and south pole portions of the sphere with the projected images thereon the sphere would be rotated towards the fixed observer or the observer would move to a proper viewing angle relative to the sphere's poles.

DESCRIPTION OF THE PRIOR ART

Systems that project images onto a spherical shaped surface are known in the prior art. For example, U.S. Pat. No. 1,042,455 to Manson discloses a method of teaching geography by projecting images onto a spherical surface with a camera.

U.S. Pat. No. 1,289,849 to Manson discloses a system of taking motion pictures of a globe to be used for educational purposes.

U.S. Pat. No. 3,586,432 to Pentes discloses a system that projects images onto the inside of a translucent spherical object which allows the images to be viewed from outside the object.

U.S. Pat. No. 6,201,516 to Tanide et al. discloses projection system that uses multiple projectors to project images on to a spherical surface.

The present invention is directed to a system for projecting images on to the surface of a object using multiple projectors spaced around the object. The object surface is reflective and the projectors are multiple synchronized computer-driven with each projected image covering a portion of the surface. The object can be substantially spherical and the images projected can represent the Earth. If the input signals to the projectors are from an Environmental Satellite System (ESS), such as the Geostationary Orbiting Environmental Satellite (GOES) System, the projected viewed surface images can show real time occurrences on the Earth such as the dynamic movement of weather conditions (clouds, etc.). GOES is operated by the National Oceanic and Atmospheric Administration (NOAA) through the National Environmental Satellite, Data and Information Service (NESDIS). By changing the projected images the generally stationary sphere realistically resembles the Earth from space while at the same time the viewer appears to be a space traveler who can view any part of the entire surface area of the sphere without moving relative to the fixed spherical surface all as will be detailed in the specification that follows hereafter.

SUMMARY OF THE INVENTION

This invention relates to a system using multiple spaced projectors for projecting images on a reflective surface of an object, such as a sphere. The surface may be generally spherically shaped with an opaque layer under the reflective outer surface layer. By using multiple synchronized computer-driven projectors spaced around the object a very realistic image is viewable on the total object surface without the object or viewer moving. Real time images from a ESS can be viewed detailing weather conditions as they change on the Earth.

It is the primary object of the present invention to provide for an improved system for viewing images on an object.

Another object is to provide for such a system wherein the object is generally spherically shaped and has a reflective outer surface and an opaque inner surface.

A still further object to provide for such a system using multiple synchronized computer-driven projectors spaced around the object which can receive input information from various sources such as a ESS, e.g., a GOES system, to view real time images.

These and other objects and advantages of the present invention will become apparent to readers from a consideration of the ensuing description and the accompanying drawings.

DESCRIPTION OF THE PREFERRED EMBODIMENT

Figure 1:
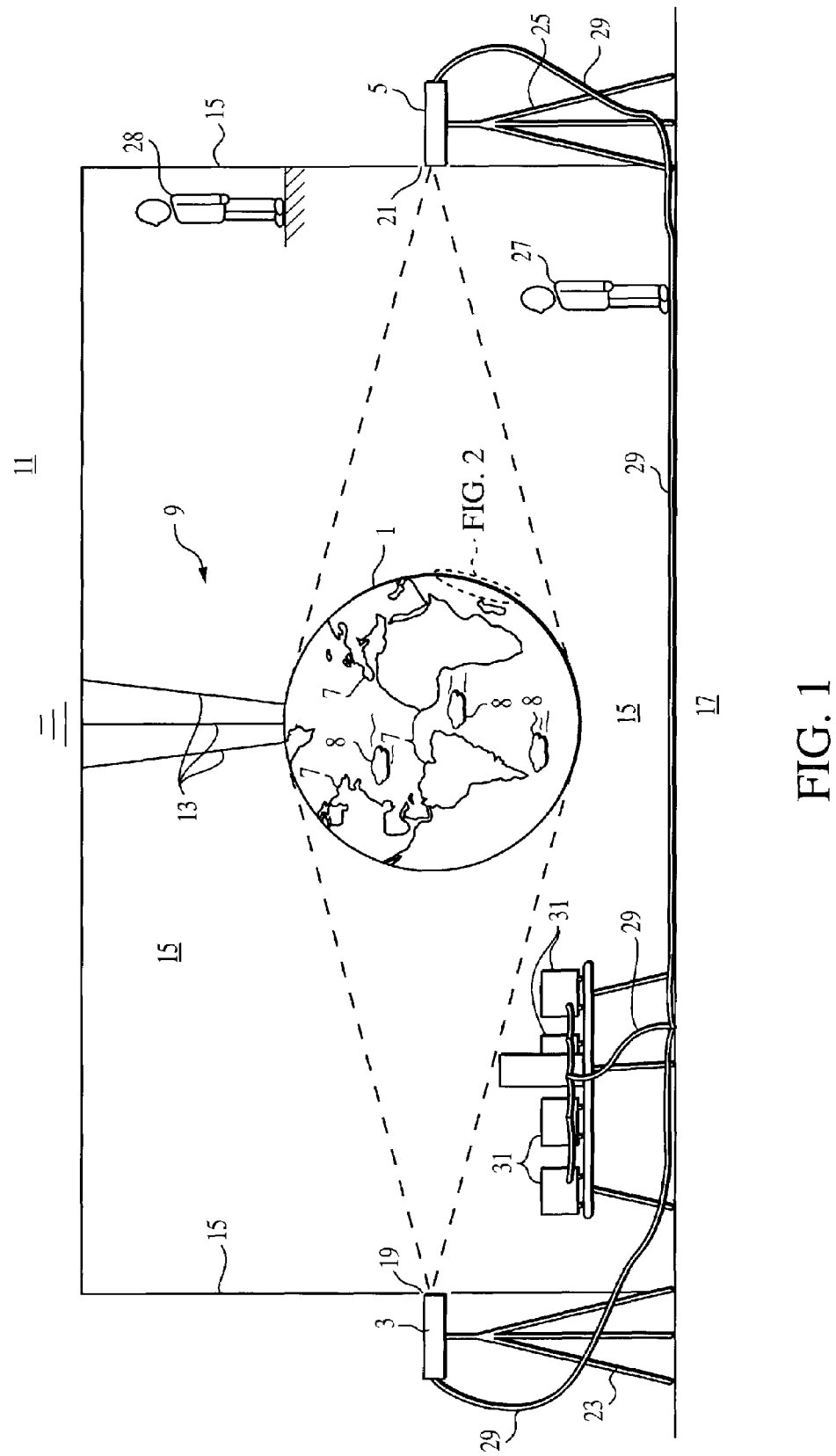
FIG. 1 is a schematic view of the preferred embodiment of the invention showing a spherically shaped suspended object with images from multiple projectors projected on the surface of the object.
Figure 2:
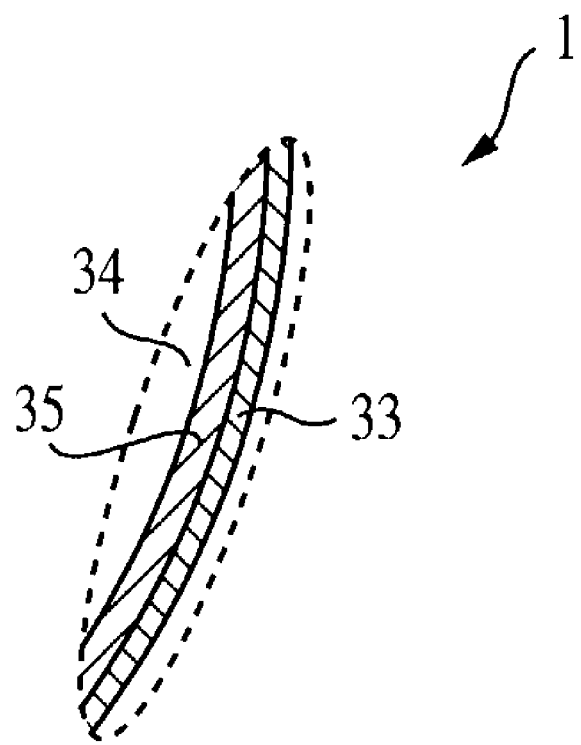
FIG. 2 is an enlarged cross sectional view of the object surface layers, taken from the circled area shown in FIG. 1 and designated by notation FIG. 2.

FIG. 1 is a schematic view of the preferred embodiment of the invention showing a spherically shaped suspended object 1 having images from multiple spaced projectors 3, 5 projected on the surface of the object. As best shown in FIG. 2, object 1 has an opaque under layer and a surface layer. The surface layer is highly reflective of the visible light received from the projectors. In this particular use, an image of the Earth is shown with both topographical and environmental features. Included as projected images are oceans and several of the different continents 7. Moving clouds 8 represent changing weather conditions or environmental features. To the observer the projected images in a time sequence make the object 1 appear to rotate while the clouds 8 move over the surface. This provides for a very realistic view as the Earth would appear from space.

Above the generally spherically shaped object 1 is the suspension system 9. Suspension system 9 is fixed to an upper fixed reference surface such as anchor 11. Three wires are attached to the upper surface of object 1. Each individual wire 13 is approximately the same length and spaced about 120 degrees apart from the other two wires. The use of three thin wires, instead of just one or four, firmly anchors the object 1 relative to the larger fixed anchor 11 to insure the object 1 will not be easily moved by air currents present in a structure. Thus, for all intents and purposes the object 1 is fixed relative to the reference anchor 11 which is a larger fixed mass such as the ceiling member of the structure. Vertical walls 15 or curtains substantially surround the object 1 on all sides. By coloring the thin wires 13 the same color as the background members 15 and making the viewed object a contrasting color, the object 1 appears as if suspended in space above the floor 17. Floor 17 can also be considered a fixed reference surface since it is fixed relative to both the ceiling 11 and object 1. Floor 17 may be colored or have a flooring covering the same color as the background members 15 and wires 13. The viewing room may be windowless. In one embodiment the walls 15 and wires 13 were both black and the viewable outer reflective surface for object 1 was white. The images projected on the surface of object 1 may be any color or combination of different colors and/or shapes. In this figure a map of the world is being projected on the surface of the object along with cloud formations 8. Maps of the moon, sun or any other know body in the universe could similarly be projected on object 1. Clearly, other means may be used for the suspension system, such as lower supports for the object 1 or the object could be firmly held in place by a magnetic field between the object and the ground or ceiling, in place of the upper wire supports. In any event the suspension system for the object 1 should be actually or nearly invisible to the naked eye and yet strong enough to give the illusion that the spherical object is suspended in space above the floor. The suspension system 9 should also firmly anchor the object 1 relative to the reference surface in which housed such that typical air currents would not move the object.

Figure 3:
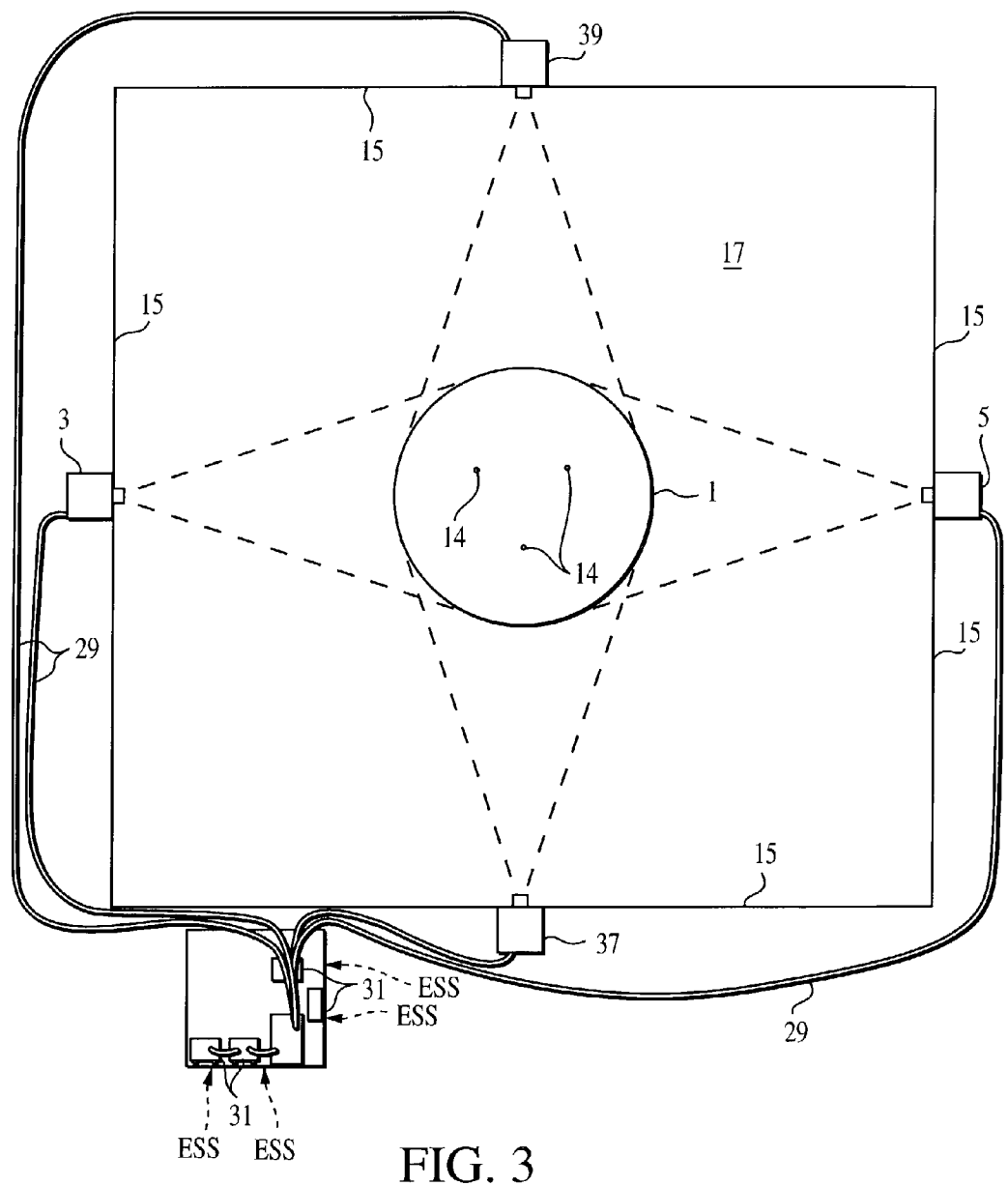
FIG. 3 is a schematic top view of a slightly modified FIG. 1 system showing four projectors spaced around the object.

Two projectors 3, 5 are shown. A frontal projector, essentially the same as the projectors 3,5, has been omitted to provide a clearer view of the suspended object 1. FIG. 3 shows the omitted frontal projector (37). In this embodiment, see FIG. 3, there are four projectors spaced around object 1. In FIG. 1 only the two opposite side projectors are shown projecting their images through narrow openings 19,21 in the surrounding walls or curtains 15. Each of the projectors need not be equally spaced from the object 1. By using different computer software and projector lenses variations in the distances from the projectors to the object 1 may be taken into consideration to insure the proper images are actually projected on the surface of object 1. Tripods, such as the two shown tripods 23,25, may support each projector above the floor or ground 17. Normally, the observers 27,28 are either below (27) or above (28) all of the projectors and not in a direct line of sight from any of them to the object 1. This observer arrangement insures the observers will not block projected images nor cast shadows on the surface of object 1.

Connected to the projectors 3,5 by cables 29 are the combined individual computers and monitors 31. Four such computer/monitor 31 combinations are shown, one for each projector. If desired, one single computer could be used to drive all of the projectors. The four computers deliver digital signals to the projectors and are interconnected to each other to insure that their individual output signals are controlled and synchronized. Each monitor for a computer monitor 31 shows the projected image from a given projector. The actual surface images projected from each projector have small areas of overlap around their edges to insure what the viewer sees is a continuous coherent surface image that covers about 360 degrees of the outer object surface. Unique computer software provides the means to insure that the user does not see the overlapping projected edges but a coherent image. It is very important to note that the object 1 be fixed relative to the reference surface anchor 11 (or surface 17) and that by changing the projected images, an observer, without moving, can view any part of the surface image on the sphere. For example, either the North or South Pole of the Earth could be viewed directly by either of the two shown observers 27,28 by using appropriate software to change the projected images. Thus, either of the observers on the floor or ground 27 or in the elevated position 28 could directly view the projected North Pole image projected of the Earth. Changing the composite images that are projected on the surface of object 1 by all of the projectors allows for this rather than either observer moving relative to the object to look at the images projected. With this type of surface image projection, the observer can be given the illusion that the Earth is being rotated with the observer positioned to directly view a selected portion of the earth, such as a pole or other area of interest on the Earth. All of this can be done without the observer actually moving from where they are located (e.g, as seated in a theater). It is as if the observer were in space above the Earth and viewing the Earth at any desired angle from that location The images projected from the different projectors form a continuous composite image on the surface of the object 1 which is the union of the individual images projected from each projector.

FIG. 2 is an enlarged cross sectional view of the object 1 surface layers, taken from the circled area shown in FIG. 1 and designated by notation FIG. 2. The shown cross section is typical of any cross section of object 1. The outer surface layer 33 of object 1 is made of a material layer that provides for light carrying images to undergo scatter reflection and not specular reflection as in a mirror. Multiple separate coats of a white screen paint were used to create the surface layer 33. The reflective layer 33 formed is a flat reflective layer and not a glossy finish. Beneath layer 33 is the inner opaque layer 35. A plastic material has been used for the background or under layer 35 and a white color was chosen as the color for layer 33 to contrast with the black background of the walls/curtains 15, floor 17 and suspension wires 13. The same layer configuration for the object surface extends completely around the total surface area of object 1. The interior volume 34 for the spherical object 1 may be hollow to reduce the weight of object 1.

FIG. 3 is a schematic top view of a slightly modified FIG. 1 system showing four projectors around the object 1. In FIG. 3 different possible input signals to the four computers/monitors 31 are used to drive the different four image projectors. Cables 29 interconnect the computers/monitors 31 and the four projectors 3,5,37 and 39. The four projectors are synchronized together and driven by the four synchronized computers or by a common computer. The angular spacing of the projectors from each other around the spherical object 1 need not be exactly equal as the projected images could be modified by their software to account for unequal spacing. The best results have been obtained when the projectors are of substantially the same type and nearly uniformly spaced around object 1. The front 37 and rear 39 projectors are shown in FIG. 3 but not in FIG. 1. All four of the projectors 3,5,37, 39 are positioned behind the wall or curtain 15 with their front lens capable of projecting images through narrow slots in the wall/curtain 15. The observer or observers would normally be within the confines of the wall/curtain 15 between the projectors and object 1. Four projectors are shown although three are believed to be the minimum number that could be used to insure the surface of object 1 is completely covered by the continuous composite projected image previously mentioned. More than four projectors can be used if desired, as long as their projected images are synchronized to insure the union of their individual images form a composite image desired on the surface of object 1. For good results the projectors can be located about six sphere radii away from the center of the spherical object 1 and slightly above the height of the center of the object.

Above the object 1 the three suspension wires 13 are each fixed to the upper surface of generally spherical object 1 at an attachment point 14. For best results, the attachment point for each wire 14 to the object should be uniformly spaced around the vertical axis of spherical object 1. As shown, each wire is thin and attached about 120 degrees from the other wire. There are three points of wire attachment 14 to object 1 at the lower ends of the three wires 13 arranged in a triangular configuration, as shown. The upper ends of wires 13 are connected to the reference surface anchor 11 by any conventional means. An inelastic cable (not shown) attached to the sphere at one end and to the reference surface anchor at the other end can be used between the object 1 and the upper anchor 11 to allow for the raising and lowering of the object 1.

As an alternative form of input, signals for the projectors may be received from an environmental satellite system (ESS), such as a GOES system or similar imaging satellite system, and sent to the computers/monitors 31. When this is done, the composite images projected on the surface of object 1 represent real time images of the Earth and show actual weather conditions as they are taking place. Using ESS, like GOES or similar imaging satellite system, input for the system images, could be displayed at airports or other locations to allow fliers to observe an overhead view of the actual weather conditions anywhere in the world.

Clearly, the system disclosed is not restricted to displaying images on a sphere that represents the Earth. The present invention could be used to display the projected images of the moon, Mars, the Sun or any other natural or artificial body in space. The object 1 need not be a perfect sphere. In fact, the Earth is not a perfect sphere. The principles behind the operation of the present invention can be applied to any object having the necessary claimed surface configuration. This system has use in movie theaters, animated images, video images, computer-generated images and full motion images. As examples, the reflective and opaque surfaces 33,35 can be made using a reflective balloon surface made of rubber, vinyl, cloth or composite materials. The edge blending of the individual projected images completely around the spherical shaped object or any convex viewing surface is important to the successful operation of the present invention.

FIGS. 1–3 are not shown to scale. In one working embodiment the spherical object 1 was approximately 6 feet in diameter with the four projectors spaced over 20 feet from the reflective surface 33. To minimize shadows from the observers on the object, the projectors are normally located above the height of the center of the sphere.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim my invention is:

1. A system for projecting images on an object comprising:
   an object having an outer surface layer,
   said outer surface layer being substantially a visible light reflecting surface,
   said object being substantially spherically shaped,
   a plurality of image projectors spaced from and around said object,
   each of said plurality of image projectors projecting an individual image on the outer surface layer of the object, and
   computer means for controlling and synchronizing the projection of the individual images from said plurality of image projectors to display a continuous time dependent and coherent image which is a composite image of the individual images from each projector to substantially cover the entire outer surface layer of the object.

2. The system as claimed in claim 1, wherein the object has an opaque layer below the outer surface layer.

3. The system as claimed in claim 1, also including a suspension system for the object that is substantially invisible to the naked eye,
   a reference surface fixed with respect to said object, and
   said suspension system restraining the movement of the object relative to the reference surface.

4. The system as claimed in claim 3, wherein the composite image on the surface of the object can be changed to permit the appearance by an observer that the surface of the object is changed while the observer remains fixed with respect to the reference surface and the object.

5. The system as claimed in claim 1, wherein the object visually resembles the shape of the Earth and the composite image projected resembles topographical characteristics normally found on the surface of the Earth.

6. The system as claimed in claim 5, wherein the composite image projected display real time weather conditions on the Earth based on signals from an environmental satellite system.

7. The system as claimed in claim 1, wherein there are at least three individual projectors forming said plurality of image projectors.

8. The system as claimed in claim 7, wherein said individual projectors are generally uniformly spaced from the object.

9. A system for projecting images on an object comprising:
   an object having a generally spherical shape with an outer surface layer,
   said outer surface layer being substantially a visible light reflecting surface,
   an opaque layer beneath the outer surface layer,
   a suspension system for the object that is substantially invisible to the naked eye,
   a reference surface fixed with respect to said object,
   said suspension system restraining the movement of the object relative to the reference surface,
   a plurality of image projectors spaced from and around said object,
   to project individual images on the outer surface of the object forming a continuous time dependent and coherent composite image,
   said coherent composite image resembling topographical characteristics normally found on the surface of the Earth, said composite image also displaying real time weather conditions on the Earth based on signals from an environmental satellite system, and computer means for controlling and synchronizing the projection of the individual images from said plurality of image projectors to display the coherent and composite image to substantially cover the entire outer surface layer of the object.

10. A system for projecting images on an object comprising:

an object having an outer surface layer, said outer surface layer being substantially a visible light reflecting surface, said object being substantially spherical in shape, a plurality of image projectors spaced from and around said object, each of said plurality of image projectors projecting an individual image on the outer surface layer of the object, a suspension system fixed to the object, said suspension system comprising at least three spaced suspension members each having a dark color surface, a dark color reference surface having a fixed upper portion where said object is mounted to said upper portion by the suspension system, said dark color reference surface also extending behind said object, said suspension system restraining the movement of the object relative to the fixed upper portion of the dark color reference surface whereby to the naked eye of a viewer the suspension system appears invisible against the dark color reference surface as light reflects off the outer surface of the object, and computer means for controlling and synchronizing the projection of the individual images from said plurality of image projectors to display a continuous time dependent and coherent image which is a composite image of the individual images from each projector to substantially cover the entire outer surface layer of the object.

* * * * *